United States Patent [19]

Suzuki

[11] Patent Number: 4,916,947

[45] Date of Patent: Apr. 17, 1990

[54] SPEED DETECTING DEVICE FOR MARINE PROPULSION UNIT

[75] Inventor: Takayoshi Suzuki, Hamamatsu, Japan

[73] Assignee: Sanshin Kogyo Kabushiki Kaisha, Hamamatsu, Japan

[21] Appl. No.: 277,146

[22] Filed: Nov. 29, 1988

[30] Foreign Application Priority Data

Nov. 30, 1987 [JP] Japan .................. 62-302530

[51] Int. Cl.$^4$ .......................................... G01P 5/16
[52] U.S. Cl. .......................................... 73/182
[58] Field of Search .................... 73/182, 183, 181

[56] References Cited

U.S. PATENT DOCUMENTS

T981,002  4/1979  Snyder ........................... 73/182

Primary Examiner—Donald O. Woodiel
Attorney, Agent, or Firm—Ernest A. Beutler

[57] ABSTRACT

An improved speed detecting device for a marine propulsion unit that includes a drilled passageway integrally formed in the lower unit housing and which cooperates with a two part flexible conduit to transmit the signal of water pressure to a remotely positioned speed detector contained within the hull of the associated watercraft.

5 Claims, 3 Drawing Sheets

SPEED DETECTING DEVICE FOR MARINE PROPULSION UNIT

BACKGROUND OF THE INVENTION

This invention relates to a speed detecting device for marine propulsion units and more particularly to an improved arrangement for transmitting a speed signal from the lower unit of a marine drive to a remotely positioned speed indicator.

Various types of speed indicating devices are employed on watercraft. One of the most effective employs a pitot type of device having an opening that is disposed to the dynamic water pressure and which is connected by means of a passageway and interconnecting conduits to a remotely position speed detector and indicator. This type of device is particularly adapted for use with the lower unit of a marine outboard drive such as the outboard drive unit of an inboard/outboard drive or of an outboard motor per se. However, with such arrangements, it has been previously necessary to provide a series of passageways that extend through the lower unit and the upper unit and then to the remotely positioned speed indicating device. However, due to the relatively complex structure of the outboard drive, the formation of such passageways in the housings has presented several problems. In addition, when the upper unit is a part of the outboard drive of an inboard/outboard unit, the problem is complicated by the general construction of such units.

It is, therefore, a principal object of this invention to provide an improved speed detecting device for a marine propulsion unit.

It is a further object of this invention to provide an improved arrangement for transmitting the water pressure signal through the outboard drive to a remotely positioned indicator.

It is yet another object of this invention to provide a simple and easily formed passageway in the lower unit of a marine outboard drive and interconnecting conduit for connecting that passageway to the remotely positioned speed detector.

SUMMARY OF THE INVENTION

This invention is adapted to be embodied in a marine outboard drive that is adapted to be connected to the transom of a watercraft and which comprises a lower unit carrying propulsion means. An upper unit is adapted to be affixed to the transom and to the lower unit. An opening is formed in the lower unit for sensing water pressure to provide a signal indicative of watercraft speed. A passage is formed in the lower unit and extends from the opening toward the upper unit. In accordance with the invention, the passage terminates adjacent the upper unit and flexible conduit means extend from the termination of the passage to a speed indicating device positioned within the hull of the watercraft.

DETAILED DESCRIPTION OF THE PREFERRED EMBODIMENT OF THE INVENTION

Figure 1:
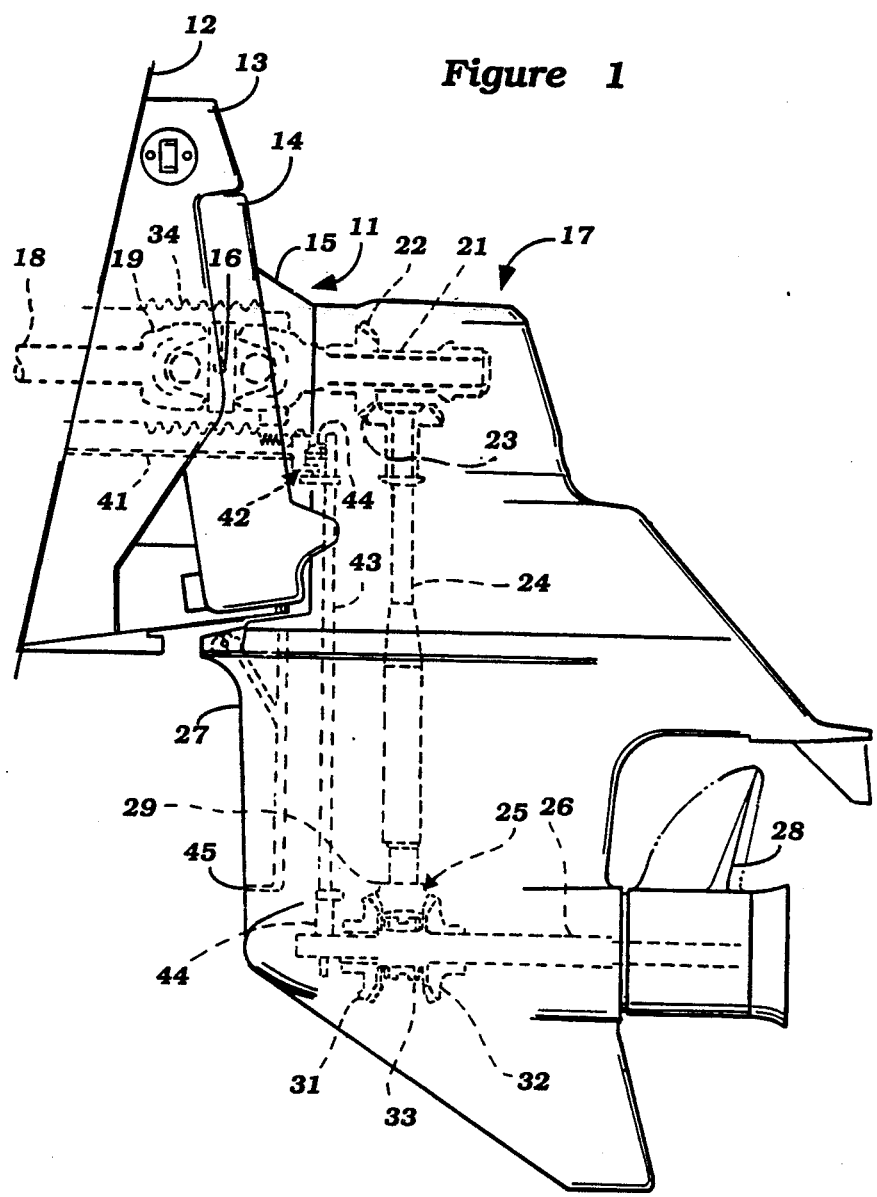
FIG. 1 is a side elevational view of a marine outboard drive constructed in accordance with an embodiment of the invention.
Figure 2:
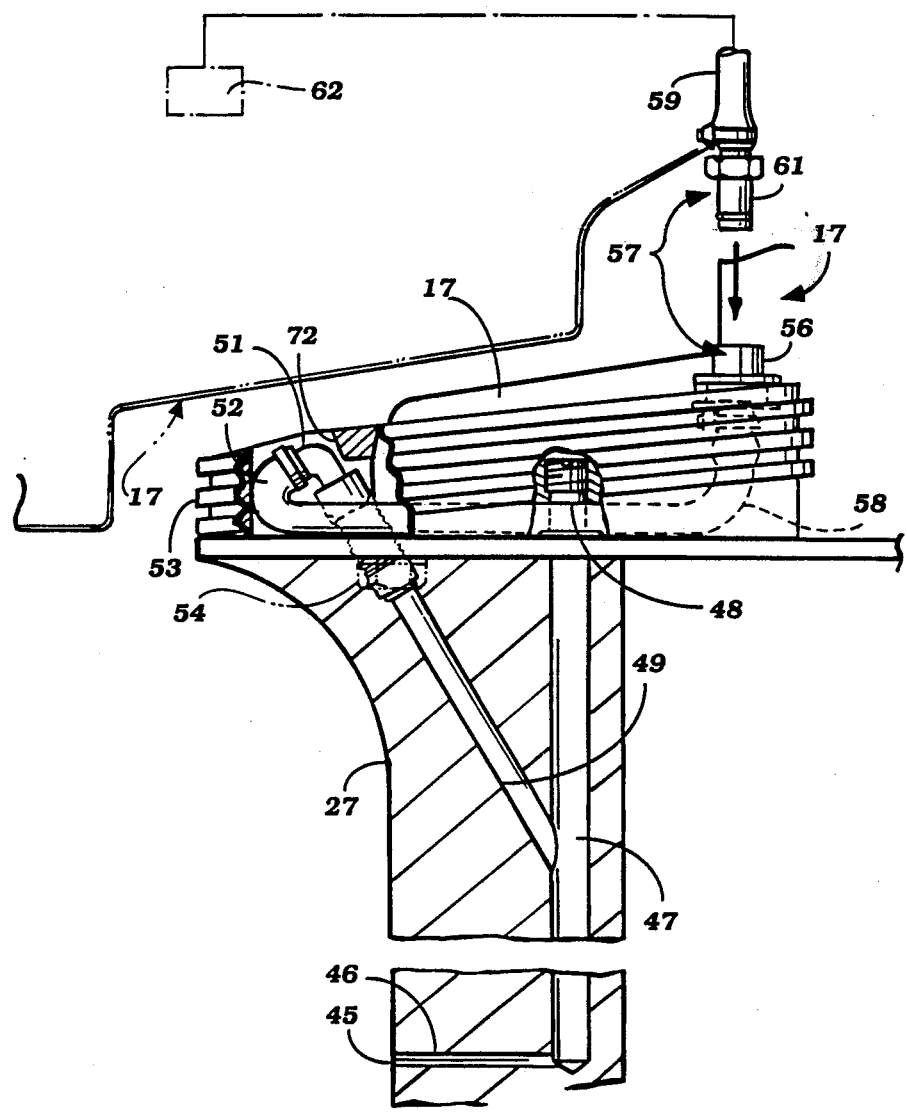
FIG. 2 is an enlarged cross-sectional view showing the speed detecting device for the propulsion unit.
Figure 3:
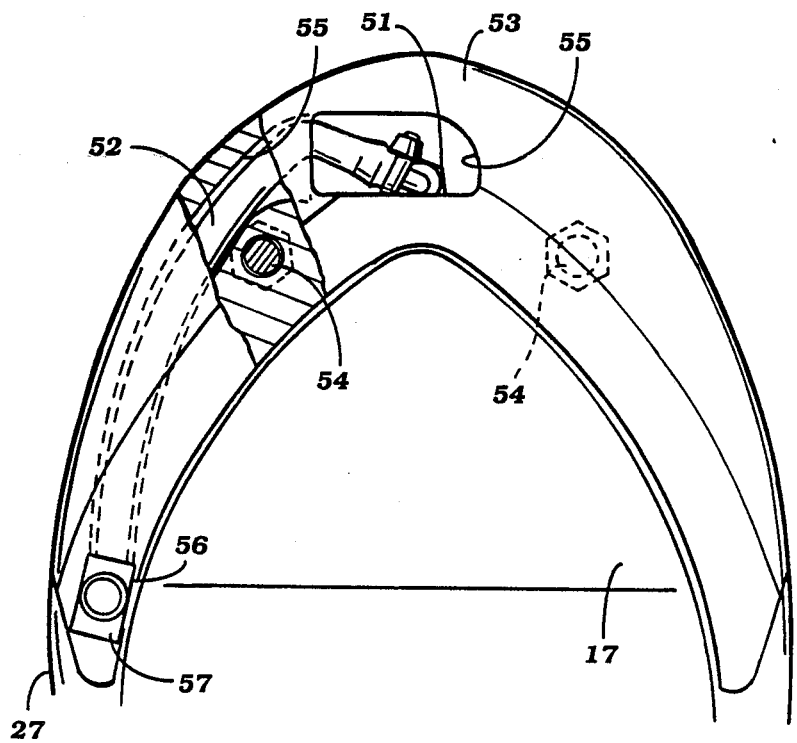
FIG. 3 is a top plan view of the portion of the lower unit shown in FIG. 2, with a part broken away.

Referring now in detail to the drawings and initially to FIG. 1, a marine outboard drive constructed in accordance with an embodiment of the invention is identified generally by the reference numeral 11. The invention is described in conjunction with the outboard drive portion of an inboard/outboard drive but, as has been noted, certain facets of the invention have similar utility in an outboard motor, per se.

The outboard drive 11 is adapted to be utilized in conjunction with an associated watercraft, the transom of which is identified at 12. A transom plate or gimbal housing 13 of the outboard drive 11 is affixed in a known manner to the transom 12 and supports a gimbal ring 14 for steering movement about a generally vertically extending axis. An upper housing portion 15 of the outboard drive unit 11 is connected to the gimbal ring 14 for tilting movement about a generally horizontally extending axis defined by a pair of gimbal pins 16 so that the angular position of a main upper unit housing 17 of the outboard drive unit may be adjusted to various trim adjusted positions and to a tilted up, out of the water position.

An engine driven output shaft 18 is driven by an inboard positioned engine (not shown) and extends through a suitable opening in the transom 12. A universal joint connection 19 interconnects the driving shaft 18 to a driven shaft 21 that is journaled within the main upper unit housing 17 in a known manner. A bevel gear 22 is affixed for rotation with the shaft 21 and is enmeshed with a driven bevel gear 23 that is non rotatably affixed to the upper end of a drive shaft 24. The drive shaft 24 is suitably journaled for rotation about a generally vertically extending axis within the upper unit housing 17 in a known manner.

A forward, neutral, reverse transmission, indicated generally by the reference numeral 25, is provided for selectively coupling the drive shaft 24 to a propeller shaft 26 that is journaled in a lower unit housing 27 of the outboard drive 11. The propeller shaft 26 is journaled in a known manner and is affixed to a propeller 28 for powering the associated watercraft.

The forward, neutral, reverse transmission 25 is generally of a known type and includes a driving bevel gear 29 that is affixed to the lower end of the drive shaft 24. The driving bevel gear 29 is enmeshed with a pair of diametrically opposed driven bevel gears 31 and 32 so that the gears 31 and 32 will rotate in opposite directions as the drive shaft 24 rotates. The transmission 25 is completed by means of a dog clutching element 33 that has a splined connection to the propeller shaft 26 and which is axially moveable therealong for engagement of dog clutching teeth carried by it with corresponding dog clutching teeth of the driven gears 31 and 32 for selectively coupling either of these gears for rotation with the propeller shaft 26 for driving it in selected forward and reversed directions. In addition, the dog clutching sleeve 33 has a neutral position in which neither of the gears 31 or 32 is coupled to the shaft 26 and hence the drive shaft 24 can rotate without driving the propeller shaft 26.

There is provided a flexible boot 34 that encircles the universal joint 19 and provides sealing between the transom 12 and the outboard drive unit.

A mechanism is provided for transmitting motion between the operator controlled shift lever (not shown) that is moveable between an forward, neutral and reverse position and which operates a shift rod 41 and the dog clutching element 33. A motion transmitting mechanism, indicated generally by the reference numeral 42 and constructed in accordance with the construction shown in the copending application, entitled "Shifting Device For Marine Propulsion Unit", Ser. No. 276,062, filed Nov. 25, 1988, in the name of Kenichi Hayasaka and assigned to the Assignee of this application, is provided to operate a shift shaft 43 which, in turn, operates a cam mechanism contained within the lower unit and identified generally at 44 for moving the dog clutching element 33. The cam mechanism 44 may be considered to be conventional.

As is noted in copending application Ser. No. 276,062, the motion transmitting mechanism 42 is operative to provide initial rapid movement of the dog clutching sleeve 33 upon initial movement of the shift rod 41 and subsequently slower movement, for the reasons described in that application. There is further provided a detent mechanism 44 of the type described in the copending application entitled "Shifting Device For Marine Propulsion Unit", Ser. No. 276,062, filed Nov. 25, 1988, in the name of Kenichi Hayasaka and assigned to the Assignee of this application for holding the shifting mechanism and specifically the motion transmitting mechanism 42 in its neutral position.

In accordance with this invention, there is also provided a speed detecting mechanism which includes a forwardly facing opening 45 that is formed in the lower unit housing 27 forwardly of the propeller 28 and, preferably, in a forwardly facing direction. The opening 45 is formed by a generally horizontally extending drilled passageway 46 formed in the lower unit housing 27. The passageway 46 is intersected by a vertically extending drilled passageway 47 that extends from the upper face of the lower unit housing 27. A plug 48 closes the upper end of this drilled passageway 46.

The passageway 47 is intersected by means of an angularly disposed drilled passageway 49 that extends from the upper surface of the lower unit housing 27 but which is positioned in a generally forward direction so as to be clear of the shift mechanism and other components of the upper housing assembly 17.

A generally elbow shaped fitting 51 is connected to the upper end of the passageway 49 and thus provides an outlet opening for the passageway that extends from the opening 45 and which is formed by the drilled passageways 46, 47 and 49. As a result, it is very easy to form the passageway for transmitting the water pressure signal from the lower unit housing 27 upwardly toward the upper unit housing 17.

One end of a first flexible conduit 52 is appropriately connected to the elbow 51 and extends along one side of the upper face of the lower unit housing 27. The elbow 51 and conduit 52 are protected by means of a cover 53 that is affixed to the lower unit housing 27 in an appropriate manner, such as by threaded fasteners 54. The cover 53 is formed with a first opening 55 that affords access to the elbow 51 for attaching and detaching the conduit 52 without removing the cover 53. A further recess 55 is formed in the cover 53 so as to accommodate the conduit 52.

The rear end of the conduit 52 has connected to it one component 56 of a quick connect fitting, indicated generally by the reference numeral 57. The conduit 52 is connected to this fitting portion 56 by means of an upwardly extending end 58 of the conduit 52. A further flexible conduit 59 has the other part 61 of the quick connect fitting attached to it so as to afford attachment and fluid communication between the conduits 52 and 59. In addition, this connection may be readily released for disassembly or servicing.

The conduit 59 can be passed suitably through the upper unit housing 17 and connected at its opposite end to a remotely positioned mechanism, indicated schematically at 62, for converting the water pressure signal into a vessel speed signal and displaying this signal.

It should be readily apparent from the foregoing description that a very simple and yet easily formed and highly effective arrangement is provided for transmitting the pressure signal from the lower unit to the remotely positioned speed detector and display 62 without necessitating complex passageways formed in both the upper housing portion 17 and the lower unit housing 27.

It is to be understood that the foregoing description is that of a preferred embodiment of the invention and that various changes and modifications may be made without departing from the spirit and scope of the invention, as defined by the appended claims.

What is claimed:

1. In a marine outboard drive adapted to be connected to the transom of a watercraft comprising a lower unit carrying propulsion means, an upper unit adapted to be affixed to the transom and said lower unit, an opening formed in said lower unit for sensing water pressure to provide a signal indicative of watercraft speed and a passage formed in said lower unit and extending from said opening toward said upper unit, the improvement comprising said passage terminating in said lower unit adjacent said upper unit and flexible conduit means comprising a first portion coupled to the termination of said passage and a second portion extending from said first portion through at least a portion of said upper unit and encircled thereby to a speed indicating device positioned within the hull of a watercraft.

2. In a marine outboard drive as set forth in claim 1 wherein the first portion is fixed relative to the upper surface of said lower unit.

3. In a marine outboard drive as set forth in claim 2 further including a cover plate affixed to said lower unit housing and enclosing the first portion of the flexible conduit.

4. In a marine outboard drive as set forth in claim 3 wherein the flexible conduit portions are connected to each other by a quick disconnect coupling.

5. In a marine outboard drive as set forth in claim 1 wherein passage formed in the lower unit is formed by a plurality of intersecting drilled passageways comprising a first horizontally extending passage extending from a forward face of said lower unit, said first passage intersecting a second passage extending vertically to an upper surface of said lower unit and closed by a plug, and a third passage extending at an angle to said upper surface from said flexible conduit means first portion and intersection said second passage between its ends.

* * * * *